United States Patent [19]

Haselkorn

[11] 4,344,802

[45] Aug. 17, 1982

[54] STABLE SLURRY OF INACTIVE MAGNESIA AND METHOD THEREFOR

[75] Inventor: Michael H. Haselkorn, Carlisle, Ohio

[73] Assignee: Armco Inc., Middletown, Ohio

[21] Appl. No.: 967,725

[22] Filed: Dec. 8, 1978

Related U.S. Application Data

[63] Continuation of Ser. No. 821,595, Aug. 4, 1977, abandoned.

[51] Int. Cl.[3] .............................................. B23K 35/24

[52] U.S. Cl. ...................................... 148/27; 148/113; 501/24

[58] Field of Search .................. 148/113, 31.5, 27, 28; 427/127, 130, 132; 423/164; 501/24

[56] References Cited

U.S. PATENT DOCUMENTS

| | | | |
|---|---|---|---|
| 2,394,047 | 2/1946 | Elsey et al. | 148/27 |
| 3,073,722 | 1/1963 | Hoehn et al. | 148/27 |
| 3,615,918 | 10/1971 | Evans et al. | 148/113 |
| 3,940,291 | 2/1976 | Evans | 148/113 |
| 3,948,786 | 4/1976 | Evans | 148/113 |

*Primary Examiner*—John P. Sheehan
*Attorney, Agent, or Firm*—Frost & Jacobs

[57] ABSTRACT

An aqueous magnesia slurry for forming an insulative glass coating on silicon steel, wherein a substantial portion of the magnesia is inactive (a citric acid activity greater than 200 seconds), a decomposable phosphate compound is present within the range of 2% to 25% by weight calculated as $P_2O_5$, based on the dry weight of magnesia, and the magnesia concentration is at least 0.24 grams per cubic centimeter of slurry. The slurry is stable against settling for up to 10 hours and has a desirable viscosity for coating application by conventional means. From 10% to 100% inactive magnesia may be used with the remainder an active magnesia (citric acid activity of 20 to 40 seconds). Preferred phosphate compounds include monocalcium phosphate monohydrate, water soluble ammonium polyphosphate and dicalcium phosphate dihydrate.

18 Claims, No Drawings

STABLE SLURRY OF INACTIVE MAGNESIA AND METHOD THEREFOR

This is a continuation of application Ser. No. 821,595 filed Aug. 4, 1977 now abandoned.

BACKGROUND OF THE INVENTION

1. Field of the Invention

This invention relates to an aqueous composition for forming an insulative glass coating directly on silicon steel strip and sheet stock, and more particularly to an aqueous magnesia slurry of high concentration wherein a substantial portion of the magnesia is an inactive magnesia (having a citric acid activity, as hereinafter defined, of greater than 200 seconds), and wherein a thermally decomposable phosphate containing compound is present as a stabilizing agent which keeps the inactive magnesia in suspension and increases the viscosity of the slurry. The invention further relates to a method of suspending an inactive magnesia in water to produce a stable slurry which can be readily applied to silicon steel surfaces to form a dried layer which will react with the steel to form a glass film during a subsequent high temperature anneal.

2. Description of the Prior Art

In the production of Oriented Silicon Steel decarburized strip and sheet stock is conventionally coated with an aqueous slurry of magnesia which is dried at low heat. During decarburization a layer of fayalite (an iron silicate) is formed on the silicon steel stock surfaces. The stock which is coated with a dried layer of magnesia is then subjected to a final, high temperature anneal at about 1095° to about 1260° C., during which the magnesia in the coating reacts with the fayalite layer to form a glass film, and the cube-on-edge orientation is developed by secondary recrystallization, as is well known in the art.

Heretofore, it has been considered necessary to use an active magnesia having a citric acid activity of less than 200 seconds, in order to provide an aqueous slurry from which the magnesia would not settle out rapidly and in order to obtain reaction between the magnesia and the fayalite surface layer. An active magnesia of the type conventionally used hydrates, with consequent increase in viscosity of the magnesia—water slurry, and this creates a problem since the viscosity of the slurry must be kept within a range which will permit application of a coating of uniform thickness by dipping, spraying, metering rolls, or the like.

Inactive magnesias have never previously been considered suitable for forming an insulative glass film on oriented silicon steel strip and sheet stock, because the dense particles could not be kept in suspension resulting in the formation of a slurry with very low viscosity. The dense inactive particles also would not react with the fayalite surface layer, at least within the time limits imposed by commercial production rates.

However, since inactive magnesias are available at much lower cost than the active magnesias, substitution of inactive magnesia in an annealing separator composition offers the prospect of very substantial economies in the processing of cube-on-edge oriented silicon steel.

Although additives to magnesia slurries have been proposed for the purpose of improving glass film properties and/or to facilitate the magnesia-fayalite reaction, to the best of applicant's knowledge no additives have been developed which are successful in stabilizing an aqueous slurry of an inactive magnesia and increasing the viscosity thereof.

The addition of phosphates to an active magnesia slurry is known, in order to improve the glass film properties and magnetic properties of the silicon steel base stock. Reference may be made to U.S. Pat. No. 3,615,918, issued to J. D. Evans and D. W. Taylor, wherein a magnesia composition containing a decomposable phosphate compound is disclosed. According to this patent, the phosphate, which ranges between 1% and 25% by weight calculated as $P_2O_5$ is reduced to elemental phosphorus during the final high temperature anneal which diffuses inwardly from the coating into the silicon steel.

Phosphate base coatings which may be applied directly to metallic surfaces, or as secondary coatings over a mill glass magnesia-base coating, are known in the art. Phosphate and magnesia-containing coatings suitable for application to oriented silicon steel surfaces, either directly or as a secondary coating, are disclosed in U.S. Pat. Nos. 3,840,378 and 3,948,876, issued to J. D. Evans.

As indicated above, to the best of applicant's knowledge, the prior art has never suggested the use of inactive magnesia for annealing separator compositions on oriented silicon steel strip and sheet stock, nor have additives been proposed which would remedy the problems inherent in using an inactive magnesia for this purpose.

SUMMARY

It is a principal object of the present invention to provide an aqueous magnesia slurry of high concentration containing a substantial portion of an inactive magnesia having a citric acid activity greater than 200 seconds which is stable against settling, which has a viscosity suitable for application by conventional means and which will react with the fayalite layer on the stock surfaces to form a uniform insulating glass film of satisfactory quality.

It is a further object of the invention to provide a method of suspending an inactive magnesia in water to produce a stable slurry which can be readily applied to silicon steel surfaces and which will react to form an insulating glass film during a subsequent high temperature anneal.

According to the invention there is provided a composition for forming an insulative glass film on oriented silicon steel strip and sheet surfaces, comprising an aqueous slurry of magnesium oxide, of which from about 10% to 100% by weight is a magnesium oxide having a citric acid activity greater than 200 seconds, a phosphate-containing compound chosen from the group consisting of calcium phosphates, water soluble ammonium polyphosphate, aluminum phosphate, magnesium phosphates, phosphoric acid, and mixtures thereof, said compound being present within the range of 2% to 25% by weight calculated as $P_2O_5$, based on the weight of magnesium oxide and balance essentially water, the magnesia concentration being at least 0.24 grams per cubic centimeter of slurry (2 pounds per gallon), said slurry being stable against settling and substantial change in viscosity for periods of time up to 10 hours.

The present invention further provides a method of suspending a magnesium oxide having a citric acid activity greater than 200 seconds in water to produce a slurry stable against settling which comprises the step of providing in said slurry a phosphate-containing compound chosen from the group consisting of calcium phosphates, water soluble ammonium polyphosphate, aluminum phosphate, magnesium phosphates, phosphoric acid, and mixtures thereof, said compound being present within the range of 2% to 25% by weight calculated as $P_2O_5$, based on the weight of magnesium oxide.

It has been found that the invention can be practiced successfully with inactive magnesia from a commercial source having a citric acid activity greater than 200 seconds, a $Cl^-$ level of 0.02% maximum and a $SO_4^{--}$ level of 0.02% maximum. Tests have been conducted on such a magnesia having a citric activity ranging from about 1500 to about 3000 seconds, wherein the inactive magnesia comprised 100% of the total magnesia content of the slurry. Blends of 50% by weight inactive magnesia with 50% by weight active magnesia have also been tested and have been found to provide optimum adherence of the dried coating to the stock and improved glass film quality. It is evident that lower proportions of inactive magnesia with an active magnesia can also be used, down to 10% inactive magnesia and 90% active magnesia for improved glass film quality, although the economic advantage of the inactive magnesia is thereby lost. At the other extreme, satisfactory results have been obtained with slurries in which 100% of the magnesia had a citric acid value greater than 200 seconds. The principal disadvantage in use of a composition in which all the magnesia is inactive arises from the fact that the adherence of the dried coating is only fair, so that care must be exercised in handling the coated coils in order to prevent removal of the magnesia coating. Where the inactive magnesia constitutes 25% to 75% of the total magnesia content, this problem is minimized. This range is thus preferred. The active magnesia preferably will have a citric acid activity of about 20 to 40 seconds.

The phosphate addition not only stabilizes the inactive magnesia slurry against settling but also increases the viscosity to a range desirable for application by conventional means such as dipping, spraying, metering rolls and the like. Moreover, the magnesia concentration can be higher than that of the prior art slurries containing only active magnesia. Such high concentrations are advantageous in that drying can be effected with less heat and in a shorter period of time, and in that ignition loss can be maintained below 1%. With such low ignition losses the glass film quality has been found to remain very uniform along both the length and the width of a coil.

DESCRIPTION OF THE PREFERRED EMBODIMENTS

Preferred phosphate compounds are monocalcium phosphate monohydrate, dicalcium phosphate dihydrate and water soluble ammonium polyphosphate. Preferably from 2.5% to 10% by weight calculated as $P_2O_5$, based on the weight of magnesia, is added. When adding monocalcium phosphate monohydrate or dicalcium phosphate dihydrate, which are particulate, the material can be dry blended with the magnesia prior to forming an aqueous slurry, or can be added to the water before, during or after mixing the magnesia therewith. Accordingly the manner in which and stage at which the phosphate compound is introduced into the slurry do not constitute a limitation on the practice of the invention. In the case of water soluble ammonium polyphosphate, which is available as an aqueous solution only, the addition is made to the water of the aqueous slurry either before or after mixing the magnesia therewith.

The high calcining temperatures used in the production of inactive magnesia result in sintering and/or agglomeration of the magnesia producing a dense particle which requires grinding to obtain the desired particle size distribution. This grinding produces magnesia particles with an active surface. Although not intending to be bound by theory, it is believed that the phosphate compound added in accordance with the present invention reacts with the magnesia particles forming a thin phosphate layer on the surface of the particles. This thin phosphate layer ($P_2O_5^-$) gives the particles a net negative charge preventing agglomeration and settling from occurring. This is believed to be the theoretical basis for the markedly improved stability against settling out which has been observed. Additionally, the stable suspension of such magnesia particles also increases the viscosity of the slurry to a desirable range.

It has been found that concentrations up to 0.6 grams per cubic centimeter (5 pounds per gallon) can be used without settling and without increasing the viscosity to an objectionable extent when the magnesia component is 100% inactive magnesia. When using a mixture of 50% inactive and 50% active magnesia, concentrations ranging from about 0.24 grams per cubic centimeter to about 0.36 grams per centimeter (3 pounds per gallon) can be used. Dried coating weights of about 7.5 to about 15 grams per square meter were obtained within the above concentrations ranges when applied in conventional manner with metering rolls.

The amount of phosphate containing compound which may be added depends upon the decarburizing and final annealing conditions, with a relatively low phosphate level for highly oxidizing decarburizing conditions, and a relatively high phosphate level for less oxidizing conditions.

Comparison of a 100% inactive magnesia slurry containing a phosphate compound in accordance with the present invention with a control slurry containing 100% of the same inactive magnesia slurry but with no additive indicated that there was no appreciable settling of the slurry of the invention after 10 hours, whereas the slurry with no additive settled out completely within one hour leaving a substantially clear supernatant liquid layer.

By way of background, it is pointed out that a cold reduced decarburized silicon steel strip and sheet stock may be prepared by conventional procedures wherein a suitable melt is cast in the form of ingots or continuously cast into slab form. If cast into ingots the steel is bloomed and slabbed in conventional manner and the slabs are hot rolled to intermediate thickness from a temperature of about 1200° to about 1400° C. with annealing after hot rolling. The hot mill scale is removed, and the material is then cold rolled to final guage in one or more stages, followed by decarburization preferably in a wet hydrogen-containing atmosphere. If the steel is continuously cast into slab form, the method disclosed in U.S. Pat. No. 3,764,406, to M. F. Littman is preferably followed.

A magnesia coating is then applied to the surfaces of the decarburized stock by dipping, spraying, metering rolls, or other conventional means. The coating is then dried by heating to a temperature sufficient to evaporate the water. The dried coating weight should preferably range between about 6 and 20 grams per square meter. The coated stock is then subjected to a final high temperature anneal at about 1095° to about 1260° C., which may be a box anneal or an open coil anneal, in a reducing atmosphere. During this anneal the magnesia reacts to form an insulative glass film, and the cube-on-edge orientation is obtained by secondary recrystallization.

The composition and method of processing the silicon steel to final strip and sheet form do not constitute a limitation on the present invention. Any of the regular or high permeability grades of oriented silicon steel on which a magnesia coating is utilized may be treated in the practice of the present invention. By way of non-limiting example, compositions and methods in which the present invention finds utility include those disclosed in U.S. Pat. Nos. 3,287,183; 3,873,381; 3,905,842; 3,905,843; 3,932,234; 3,957,546 and 4,000,015. Except for No. 3,932,234, these patents relate to the production of high permeability material (relative permeability greater than 1850 at 796 A/m) by means of boron and nitrogen additions to the steel. Manganese and sulfur (and/or selenium) may also be present.

For a regular grain oriented silicon steel wherein manganese and sulfur (and/or selenium) are present as grain growth inhibitors, a typical but non-limiting composition for the cold rolled and decarburized stock may comprise, in weight percent, about 2% to about 4% silicon, about 0.01% to about 0.4% manganese, about 0.01% to about 0.03% sulfur, about 0.002% to about 0.005% carbon, up to about 0.065% (total) aluminum, and balance iron plus incidental impurities.

Two series of laboratory tests were conducted which demonstrated the effectiveness of phosphate addition to an aqueous slurry of an inactive magnesia. In both series of tests the magnesia was from a commercial source and had a citric acid activity of about 2000 seconds. The phosphate compound used was monocalcium phosphate monohydrate (sold by Stauffer Chemical Company under the designation "12 XX" and sold by Monsanto Corporation under the designation "MC.P."). Both sources were in particulate form.

In the first series aqueous slurries were prepared each containing 0.6 grams per cubic centimeter of magnesia, the first slurry containing no additive, and the remaining slurries containing 2.5%, 5%, 7.5% and 10% respectively of the calcium phosphate calculated as $P_2O_5$, based on the weight of magnesia. Decarburized silicon steel stock of 14 mil thickness was coated with each of the slurries. The slurry containing no additive and the slurry containing 2.5% phosphate did not wet the stock well and without agitation the magnesia tended to settle out rapidly. No problems were encountered with coating with the remaining slurries.

After a final high temperature anneal at 1200° C., examination of the glass film developed on each sample indicated that they ranged from a thin rainbow glass for the composition containing no additive to a light gray continuous film for the slurries containing more than 5% phosphate. A progressive improvement in the physical appearance of the glass film was noted for each higher amount of phosphate additive.

The second series involved preparation of slurries containing 100% inactive magnesia with 0%, nominal 5%, 7.5% and 10% additions of calcium phosphate calculated as $P_2O_5$; 50% inactive magnesia by weight with 50% active magnesia by weight having a citric acid activity of about 30 seconds with 0%, nominal 2.5% and 5% calcium phosphate calculated as $P_2O_5$, and 50% by weight inactive magnesia with 50% active magnesia from another source having citric acid activity of 30 seconds with 0%, nominal 2.5% and 5% calcium phosphate, calculated as $P_2O_5$. A control composition was also prepared containing 50% each by weight of the active magnesias from the two sources with 2.5% by weight addition of calcium phosphate calculated as $P_2O_5$.

The active magnesias which were used had the following specifications:

$F^-$: less than 500 ppm
$Cl^-$: less than 200 ppm
$Na^-$: less than 200 ppm
Ignition loss at 100° C.: 1.5–13.0%
Citric acid activity: 20 to 40 seconds
Particle size: 99.9% through 200 mesh; 99.5% through 325 mesh.

These specifications should be observed in the practice of the invention, although the citric acid activity may range up to less than 200 seconds, as indicated previously.

The slurries in which all the magnesia was inactive were prepared with a concentration of 0.60 grams per cc, whereas the slurries containing 50% inactive and 50% active magnesias were prepared with concentrations of 0.36 grams per cc. The control slurry was prepared with a concentration of 0.144 grams per cc.

Decarburized silicon steel sheets of 11 mil thickness were coated with each of the above slurries and were subjected to a box anneal in a reducing atmosphere at about 1200° C. No coating problems were encountered with any of the slurries except the one containing only inactive magnesia with no addition of calcium phosphate. All the remaining slurries remained in suspension and wet the stock well.

Evaluation of the glass films formed by the various slurries indicated the following:

The inactive magnesia with no calcium phosphate addition formed a thin, discontinuous glass film.

The slurries of 100% inactive magnesia with additions of 5% and 7.5% calcium phosphate calculated as $P_2O_5$, formed a thin, rough, light gray glass film. The slurry containing 100% inactive magnesia and 10% by weight calcium phosphate resulted in a rough, reddish gray poor quality glass film.

The mixtures of 50% inactive magnesia and 50% active magnesia formed glass films with improved physical appearance. The slurries containing no calcium phosphate additions to these mixtures exhibited a continuous gray glass film with a slightly rough texture. The calcium phosphate additions of 2.5% and 5% calculated as $P_2O_5$ resulted in the formation of a smoother, ligher gray glass film.

All the slurries containing 100% inactive magnesia had poor oxidation resistance regardless of the calcium phosphate additions.

The slurries containing 50% inactive magnesia and 50% active magnesia with no calcium phosphate addition also exhibited poor oxidation resistance. Slurries containing 2.5% calcium phosphate calculated as $P_2O_5$ exhibited somewhat improved oxidation resistance. The best oxidation resistance was exhibited by slurries containing 50% inactive and 50% active magnesias with 5% calcium phosphate calculated as $P_2O_5$. By way of comparison the control sample containing equal parts of the two active magnesias with 2.5% calcium phosphate addition, had poor oxidation resistance.

Secondary coatings of the type disclosed in the above-mentioned U.S. Pat. Nos. 3,840,378 and 3,948,876 (containing magnesia, phosphate and aluminum) were applied to all samples, and tested for adherence. The adherence of the secondary coatings followed the same trend as oxidation resistance. Glass films which demonstrated good oxidation resistance had good adherence of the secondary coating while those which had poor oxidation resistance exhibited poor adherence of the secondary coatings. The best adherence was exhibited by mixtures of 50% active and 50% inactive magnesias with 5% calcium phosphate calculated as $P_2O_5$.

Various magnetic properties of the samples of the second series were determined at 60 Hz and are summarized in Table I. It will be noted that of the compositions containing 100% inactive magnesia the best magnetic quality was exhibited by the sample containing a nominal 5% calcium phosphate addition calculated as $P_2O_5$. Additions of nominal 7.5% and 10% calcium phosphate resulted in a decrease in magnetic quality.

The magnetic quality of samples containing 50% inactive and 50% active magnesias exhibited a surprising improvement, particularly with calcium phosphate additions. With no calcium phosphate addition the magnetic quality was comparable to that of the control sample. With calcium phosphate additions of nominal 2.5 and 5% calculated as $P_2O_5$, all samples exhibited a significant improvement in magnetic quality as compared to the control sample.

Plant trials were next conducted using decarburized silicon steel coils of 11 mil thickness within the conventional steel composition ranges set forth above, and coils were coated with the following composition:

50% by weight inactive magnesia CAA 2000 seconds
50% active magnesia CAA 30 seconds
5% monocalcium phosphate monohydrate calculated as $P_2O_5$.
balance water Slurry concentrations and coating weights of the dried coatings are set forth in Table II. No coating problems were encountered. The slurry wet the strip very well producing smooth, uniform coatings; the as dried adherence was fair. No appreciable settling was observed in the coating pan.

It was found that the coatings dried much more rapidly than conventional coatings containing only active magnesia. Consequently coatings containing inactive magnesia can be dried at lower temperature, thus reducing the amount of energy required.

The coated coils were box annealed in a reducing atmosphere at about 1150° C. in conventional manner for 24 hours. The coils formed an excellent glass film which was light gray, smooth, continuous and devoid of any oxide or rainbow. Moreover the coil front end to coil back end variation in physical appearance of the glass film which normally occurs with conventional active magnesias, was not present in any of these coils.

Magnetic properties of the above coils are reported in Table III together with magnetic properties of control coils from the same heat coated with a mixture of 50% active magnesia CAA 30 seconds from a first source and 50% active magnesia CAA 30 seconds from a second source. It is evident that the magnetic quality of coils coated with the composition of the invention was good and equal to or better than those of the control coils.

Further tests have been conducted showing that the composition and method of the present invention are applicable to the production of very high permeability silicon steel containing boron and nitrogen in accordance with the teachings of U.S. Pat. No. 3,873,381, and wherein boron and titanium dioxide are added to the magnesia composition. Prior art magnesia compositions to which boron and titanium dioxide additions are made have always contained only an active magnesia having a citric acid activity ranging from, e.g., about 20 to about 80 seconds. The boron addition may be in the form of a boron compound such as boric acid, sodium tetraborate, and the like.

In these tests a mixture of 50% by weight of an inactive magnesia from a domestic source having a CAA of about 2000 seconds, and 50% by weight of an active magnesia from a domestic source having a CAA of about 30 seconds, was used as the base composition. An active magnesia from a Japanese source having a CAA of about 30 seconds was used as a control since this had produced optimum glass film properties and magnetic quality in the production of very high permeability material by prior art methods. This contained 0.08% boron as supplied.

The base composition was mixed with water to form a slurry having a concentration of 0.36 gm per cc. Various combinations of additives were mixed with slurry samples, based on the total dry magnesia weight, as follows:

| % monocalcium phosphate monohydrate as $P_2O_5$ | % Boron | % $TiO_2$ |
|---|---|---|
| 5 | 0 | 0 |
| 10 | 0 | 0 |
| 15 | 0 | 0 |
| 20 | 0 | 0 |
| 5 | .12 | 0 |
| 10 | .12 | 0 |
| 15 | .12 | 0 |
| 20 | .12 | 0 |
| 5 | 0 | 5 |
| 10 | 0 | 5 |
| 15 | 0 | 5 |
| 20 | 0 | 5 |
| 5 | 0 | 10 |
| 10 | 0 | 10 |
| 15 | 0 | 10 |
| 20 | 0 | 10 |
| 5 | .12 | 5 |
| 10 | .12 | 5 |
| 15 | .12 | 5 |
| 20 | .12 | 5 |
| 5 | .12 | 10 |
| 10 | .12 | 10 |
| 15 | .12 | 10 |
| 20 | .12 | 10 |

The control composition was mixed with water to form a slurry of 0.147 gm per cc concentration, and 5% titanium dioxide (based on the weight of magnesia) was added.

Coatings were applied to decarburized blanks of very high permeability silicon steel of 11 mil thickness, and coating weights as-dried ranged from 10 to 12 gm per $m^2$. The coated blanks were then subjected to a final anneal in a reducing atmosphere which included holding at 1190° C. in pure hydrogen for 24 hours.

Evaluation of the various coated and annealed blanks showed the following results:

The samples with 5%, 10%, 15% and 20% calcium phosphate with and without boron additions plus titanium dioxide, developed smooth, light gray glass films.

Titanium dioxide additions made the glass film rougher and darker gray. At 5% calcium phosphate and 5% and 10% titanium dioxide the physical appearance was similar to that of the control sample (containing 5% titanium dioxide). At 10%, 15% and 20% calcium phosphate levels the glass film was progressively rougher and darker in color.

Secondary coatings of the type disclosed in the above mentioned U.S. Pat. No. 3,840,378 were applied. Samples containing 5% and 10% calcium phosphate plus 5% and 10% titanium dioxide had the best appearance.

In samples containing no titanium dioxide the secondary coating adherence was poor. The titanium dioxide-containing samples had improved adherence. The sample containing 5% calcium phosphate and 5% titanium dioxide had adherence similar to that of the control sample, while the adherence of the sample containing 10% calcium phosphate and 5% titanium dioxide was superior to that of the control sample.

With respect to magnetic quality, samples containing 5%, 10% and 15% calcium phosphate (with no boron and titanium dioxide additions) had similar properties, i.e., core loss at 1.7 T and 60 Hz of 1.675 watts/kg, and relative permeability of 1875 at 796 A/m.

In the samples containing 0.12% boron and no titanium dioxide, the magnetic quality was inferior to that of samples above containing no boron and no titanium dioxide.

Samples containing titanium dioxide and no boron exhibited inferior magnetic quality.

Samples containing boron and titanium dioxide exhibited improved magnetic quality, the best being obtained with 5% calcium phosphate, 0.12% boron and 5% titanium dioxide. The core loss for the best sample was 1.679 watts/kg at 1.7 T and 60 Hz, and relative permeability was 1880 at 796 A/m, as compared to 1.682 watts/kg and 1905 for the control sample.

It was further observed that boron additions increased the final grain size significantly, and that calcium phosphate additions greater than 5% (with boron and titanium dioxide) were detrimental to magnetic quality.

It is therefore evident that in the production of very high permeability material a best combination of properties is obtained with 5% to 10% phosphate compound calculated as $P_2O_5$, about 0.10% to about 0.15% boron, and about 5% to about 10% titanium dioxide, based on the weight of magnesia. These ranges are applicable to a magnesia composition wherein about 25% to about 75% is an inactive magnesia having a CAA of about 1500 to about 3000 seconds and the remainder is an active magnesia having a CAA of about 20 to 40 seconds.

The above data show that calcium phosphate additions significantly change the reactions which occur and the composition of the glass film during the final high temperature anneal. The phosphate oxidizes the silicon and iron on the stock surface increasing the amount of fayalite at the surface. The phosphorus is thus reduced, and most of it diffuses harmlessly into the steel, as described in the above-mentioned U.S. Pat. No. 3,615,918. On the other hand, calcium, in the form of calcium oxide, acts as a fluxing agent causing liquid formation at a lower temperature. The calcium oxide reacts with the fayalite on the silicon steel surfaces to form wollastonite, which is a magnesium and calcium oxide-silicon dioxide complex. Wollastonite melts about 200° C. lower than fayalite, and this increased amount of liquid phase formtion is thus able to take the magnesia into solution more readily to complete the glass film formation.

The citric acid activity is a measure of the hydration rate of magnesium oxide and is determined by measuring the time required for a given weight of a magnesia to provide hydroxyl ions sufficient to neutralize a given weight of citric acid. The test is the same as that reported in U.S. Pat. No. 3,841,925, viz.;

1. 100 ml of 0.400 normal aqueous citric acid containing 2 ml of 1% phenolphthalein indicator is brought to 30° C. in an 8 ounce wide mouth jar. The jar is fitted with a screw cap and a magnetic stirrer bar.
2. Magnesia weighing 2.00 g is admitted to the jar, and a stop watch is started at the same instant.
3. As soon as the magnesia sample is added the lid is screwed on the jar. At the 5 second point the jar and contents are vigorously shaken. Shaking is terminated at the 10 second point.
4. at the 10 second point the sample is placed on a magnetic stirrer assembly. Mechanical stirring should produce a vortex about 2 cm deep at the center when the inside diameter of the jar is 6 cm.
5. The stop watch is stopped at the instant the suspension turns pink, and the time is noted. This time in seconds is the citric acid activity.

TABLE I

| | Magnetic Properties | | | |
|---|---|---|---|---|
| | $Ca(H_2PO_4).H_2O$ nominal wt. percent | Core Loss Watts/kg at 60Hz | | Relative permeability at |
| Magnesia | as $P_2O_5$ | 1.5 T | 1.7 T | 796 A/m |
| 100% inactive (CAA 2000 secs.) | 0 | 1.065 | 1.583 | 1840 |
| 100% inactive | 5 | 1.054 | 1.526 | 1840 |
| 100% inactive | 7.5 | 1.116 | 1.662 | 1823 |
| 100% inactive | 10 | 1.111 | 1.638 | 1824 |
| 50% inactive + 50% active CAA 30 sec. | 0 | 1.056 | 1.563 | 1834 |
| 50% inactive + 50% active CAA 30 sec. | 2.5 | 1.038 | 1.519 | 1835 |
| 50% inactive + 50% active CAA 30 sec. | 5 | 1.038 | 1.493 | 1844 |
| 50% inactive + 50% active CAA 30 sec. | 0 | 1.052 | 1.552 | 1836 |
| 50% inactive + 50% active CAA 30 sec. | 2.5 | 1.038 | 1.515 | 1837 |
| 50% inactive + 50% active CAA 30 sec. | 5 | 1.042 | 1.506 | 1842 |
| 50% active CAA 30 sec. | | | | |

TABLE I-continued

| Magnesia | Magnetic Properties Ca $(H_2PO_4).H_2O$ nominal wt. percent as $P_2O_5$ | Core Loss Watts/kg at 60Hz 1.5 T | 1.7 T | Relative permeability at 796 A/m |
|---|---|---|---|---|
| + 50% active CAA 30 sec. | 2.5 | 1.060 | 1.559 | 1837 |

TABLE II

| Sample | Coating Conditions Concentration g/cc | Coating Weight $g/m^2$ |
|---|---|---|
| (Coil 1) | 0.195 | 11.34 |
| (Coil 2) | 0.248 | 15.12 |
| (Coil 3) | 0.225 | 11.34 |

TABLE III

| Sample | Front Watts/kg at 1.7T and 60Hz | Front Relative Permeability at 796 A/m | Front Frank. Res. Amps. | Back Watts/kg at 1.7 and 60Hz | Back Relative Permeability at 796 A/m | Back Frank. Res. Amps. |
|---|---|---|---|---|---|---|
| Composition of the invention (average of 3 coils) | 1.516 | 1840 | 0.777 | 1.527 | 1830 | 0.863 |
| Control (average of 5 coils) | 1.527 | 1840 | 0.856 | 1.596 | 1818 | 0.864 |

The embodiments of the invention in which an exclusive property or privilege is claimed are defined as follows:

1. A composition for forming an insulative glass film on oriented silicon steel strip and sheet surfaces, comprising an aqueous slurry of magnesia, at least 25% of said magnesia having a citric acid activity greater than 200 seconds, a phosphate-containing compound chosen from the group consisting of calcium phosphates, water soluble ammonium polyphosphate, aluminum phosphate, magnesium phosphates, phosphoric acid, and mixtures thereof, said compound being present within the range of 2% to 25% by weight calculated as $P_2O_5$, based on the weight of magnesia, and balance essentially water, the magnesia concentration being up to 0.6 gram per cubic centimeter of slurry, said slurry being stable against settling for periods of time up to 10 hours.

2. The composition claim in claim 1, wherein said magnesia comprises about 50% by weight of a magnesia having a citric acid activity of about 1500 to about 3000 seconds and about 50% by weight of a magnesia having a citric acid activity of about 20 to 40 seconds.

3. The composition claimed in claim 1, wherein said phosphate-containing compound is present within the range of about 2.5% to about 10% by weight calculated as $P_2O_5$, based on the weight of magnesia.

4. The composition claimed in claim 1, wherein said magnesia comprises about 25% to about 75% by weight magnesia having a citric acid activity of about 1500 to about 3000 seconds and the remainder a magnesia having a citric acid activity of about 20 to 40 seconds, and wherein said phosphate-containing compound is within the range of about 2.5% to about 10% by weight calculated as $P_2O_5$, based on the weight of magnesia.

5. The composition claimed in claim 1, wherein said magnesia comprises about 50% by weight of a magnesia having a citric acid activity of about 1500 to 3000 seconds and about 50% by weight of magnesia having a citric acid activity of about 30 seconds, and wherein said phosphate-containing compound is present within the range of about 2.5% to about 10% by weight calculated as $P_2O_5$, based on the weight of magnesia.

6. The composition claimed in claim 1, wherein said phosphate-containing compound is monocalcium phosphate monohydrate.

7. The composition claimed in claim 1, wherein said phosphate-containing compound is dicalcium phosphate dihydrate.

8. The composition claimed in claim 1, wherein said phosphate-containing compound is water soluble ammonium polyphosphate.

9. The composition claimed in claim 4, wherein said silicon steel has very high permeability, wherein said phosphate-containing compound is within the range of about 5% to 10% by weight calculated as $P_2O_5$, and including about 0.10% to about 0.15% boron and about 5% to about 10% titanium dioxide, based on the weight of magnesia.

10. The method of suspending in water a magnesia at least 25% of which consists of magnesia having a citric acid activity greater than 200 seconds to produce a slurry having increased viscosity and stability against settling, which comprises the step of providing in said slurry a phosphate-containing compound chosen from the group consisting of calcium phosphates, water soluble ammonium polyphosphate, aluminum phosphate, magnesium phosphates, phosphoric acid, and mixtures thereof, said compound being present within the range of 2% to 25% by weight calculated as $P_2O_5$, based on the weight of magnesia.

11. The method claimed in claim 10, wherein the magnesia concentraion of said slurry is at least 0.24 grams per cubic centimeter of slurry.

12. The method claimed in claim 10, wherein said magnesia comprises about 25% to 75% by weight of a magnesia having a citric acid activity of about 1500 to about 3000 seconds and the remainder a magnesia having a citric acid activity of about 20 to 40 seconds.

13. The method claimed in claim 10, wherein said magnesia comprises about 50% by weight of a magnesia having a citric acid activity of about 1500 to 3000 seconds and about 50% by weight of a magnesia having a citric acid activity of about 30 seconds.

14. The method claimed in claim 10, wherein said phosphate-containing compound is present within the range of about 2.5% to about 10% by weight calculated as $P_2O_5$, based on the weight of magnesia.

15. The method claimed in claim 10, wherein said phosphate-containing compound is monocalcium phosphate monohydrate.

16. The method claimed in claim 10, wherein said phosphate-containing compound is dicalcium phosphate dihydrate.

17. The method claimed in claim 10, wherein said magnesia comprises about 50% by weight of a magnesia having a citric acid activity of about 1500 to 3000 seconds and about 50% by weight of a magnesia having a citric acid activity of about 30 seconds, and wherein said phosphate-containing compound is monocalcium phosphate monohydrate and is present within the range of about 2.5% to about 10% by weight calculated as $P_2O_5$, based on the weight of magnesia.

18. The method claimed in claim 12, wherein said phosphate-containing compound is present within the range of about 5% to 10% by weight calculated as $P_2O_5$, and including the step of providing in said slurry about 0.10% to about 0.15% boron and about 5% to about 10% titanium dioxide, based on the weight of magnesia.

* * * * *